(12) United States Patent
Hageman

(10) Patent No.: US 8,697,679 B2
(45) Date of Patent: Apr. 15, 2014

(54) METHOD AND COMPOSITION FOR TREATING OR PREVENTING CATABOLISM OR STIMULATING ANABOLISM IN A MAMMAL UNDERGOING METABOLIC STRESS

(75) Inventor: Robert Johan Joseph Hageman, Wageningen (NL)

(73) Assignee: N.V. Nutricia, Zoetermeer (NL)

( * ) Notice: Subject to any disclaimer, the term of this patent is extended or adjusted under 35 U.S.C. 154(b) by 2453 days.

(21) Appl. No.: 10/793,871

(22) Filed: Mar. 8, 2004

(65) Prior Publication Data

US 2004/0192615 A1    Sep. 30, 2004

Related U.S. Application Data

(60) Provisional application No. 60/452,537, filed on Mar. 7, 2003.

(30) Foreign Application Priority Data

Jun. 19, 2003 (NL) ........................ PCT/NL03/00449

(51) Int. Cl.
*A01N 43/00* (2006.01)
*A61K 31/33* (2006.01)

(52) U.S. Cl.
USPC .......................................................... 514/183

(58) Field of Classification Search
USPC .......................................................... 514/183
See application file for complete search history.

(56) References Cited

U.S. PATENT DOCUMENTS

| | | | |
|---|---|---|---|
| 3,873,722 A * | 3/1975 | Smythies ...................... | 514/561 |
| 4,053,589 A * | 10/1977 | Gans et al. ...................... | 514/21 |
| 4,766,149 A | 8/1988 | Osswald et al. | |
| 5,026,721 A | 6/1991 | Dudrick et al. | |
| 5,236,899 A | 8/1993 | Durette | |
| 5,665,371 A | 9/1997 | Hoerrmann | |
| 2001/0033884 A1 | 10/2001 | Yamada et al. | |
| 2002/0065320 A1 | 5/2002 | Messadek | |
| 2002/0086815 A1 * | 7/2002 | McMorris et al. ................ | 514/2 |

FOREIGN PATENT DOCUMENTS

EP    0363879 A2 *    4/1990    ............. A23L 1/305

OTHER PUBLICATIONS

Suggitt and Bibby, 2005, Clinical Cancer Research, vol. 11, 971-981.*
Laird, P W et al., DNA methylation and cancer, XP-002252522, Human molecular genetics, England, 1994, ISSN 0964-6906 (abstract).

* cited by examiner

*Primary Examiner* — Benjamin Packard
(74) *Attorney, Agent, or Firm* — Young & Thompson

(57) ABSTRACT

The invention is concerned with a method and a composition for treating or preventing catabolism or of stimulating anabolism in a mammal undergoing metabolic stress. The method comprises administering to the mammal a composition containing methyl donors selected from the group consisting of L-serine, methionine, choline, phosphatidyl choline, betaine, dimethylglycine, sarcosine, methylated folates, S-adenosyl methionine, thymidine triphosphate, adenosine triphosphate and optionally methyl acceptors selected from the group consisting of L-glycine, ethanolamine, phosphatidyl ethanolamine, folate, ribose, wherein the total molar amount of methyl donors delivered by the method exceeds the total molar amount of methyl acceptors delivered by the method by at least 0.18 mmol per kg of body weight per day.

22 Claims, No Drawings

METHOD AND COMPOSITION FOR TREATING OR PREVENTING CATABOLISM OR STIMULATING ANABOLISM IN A MAMMAL UNDERGOING METABOLIC STRESS

TECHNICAL FIELD OF THE INVENTION

The invention relates to a method of treating or preventing catabolism or of stimulating anabolism in a mammal undergoing metabolic stress. More particularly, the present method is concerned with such a method that comprises administering to the mammal a composition containing one or more methyl donors selected from the group consisting of serine, methionine, phosphatidyl choline, choline, betaine, dimethylglycine, sarcosine, methylated folates, S-adenosyl methionine, thymidine triphosphate, and adenosine triphosphate and optionally one or more methyl acceptors selected from the group consisting of L-glycine, phosphatidyl ethanolamine, ethanolamine, folate, ribose and nicotinamide, wherein the total molar amount of methyl donors delivered by the method exceeds the total molar amount of methyl acceptors delivered by the same method by at least 0.18 mmol per kg of body weight per day.

Another aspect of the invention relates to a method for the stimulation and/or increase of anabolic processes and/or the providing of an increase of the lean body mass, and/or prevention and/or treatment of muscle catabolism or even cachexia and/or for the improvement of the energy status of tissues and cells by administering to the mammal a composition containing methyl donors and optionally methyl acceptors as given above, wherein the total molar amount of methyl donors delivered by the method exceeds the total molar amount of methyl acceptors delivered by the method by at least 0.18 mmol per kg of body weight per day.

Still another aspect of the invention relates to a method for the prevention and/or treatment, in particular prevention of disorders selected from cancer, neurological disorders, migraine, allergy, immune deficiencies, chronic fatigue, insulin resistance which improves glucose tolerance and decreases side effects of diabetes type II, cardiovascular and cerebrovascular disorders, hypertension, subfertility, uncontrolled inflammation processes, pneumonia, and/or prevention of hearing loss, and/or improvement of wound healing, and/or improvement of gut barrier function and/or prevention of sepsis, by administering to the mammal a composition containing methyl donors and optionally methyl acceptors as given above, wherein the total molar amount of methyl donors delivered by the method exceeds the total molar amount of methyl acceptors delivered by the method by at least 0.18 mmol per kg of body weight per day, preferably of at least 0.8 mmol per kg of body weight per day.

In a further aspect of the invention, there is provided a method for increasing the methylation capacity of a subject, which method comprises administering to the mammal a composition containing methyl donor L-serine and optionally methyl acceptors selected from the group consisting of L-glycine, ethanolamine, phosphatidyl ethanolamine, folate, ribose, wherein the total molar amount of methyl donors delivered by the method exceeds the total molar amount of methyl acceptors delivered by the method by at least 0.18 mmol per kg of body weight per day.

Another aspect of the invention relates to a pharmaceutical or nutritional composition containing at least 0.5 mmol of methyl donors per gram of dry matter and between 0.01 and 1000 µmol of methyl acceptors per gram of dry matter, wherein the methyl donors and methyl acceptors are contained in the composition in a molar ratio of at least 3:1.

BACKGROUND OF THE INVENTION

It is well known that both negative energy balance and muscle catabolism are consequences of physiological/metabolic stress that often accompanies protein calorie malnutrition, strenuous physical exercise, physical trauma, burn injury, surgical trauma, malnutrition, maldigestion, malabsorption, hyperthyroidism, chemotherapy, radiation therapy, anorexia, cachexia, short bowel syndrome, especially in people of older age. It is also known that maintaining a positive metabolic energy balance can help to alleviate such problems.

During severe stress, regardless of the initiating cause, there is an important mobilization of amino nitrogen from skeletal muscle and connective tissue to support the synthesis of visceral and acute phase proteins. This metabolic response, which is best understood as a redistribution of nutrients from reserves to more active tissues for host defense and recovery, results in the acceleration of protein degradation and an elevation of energy expenditure. In addition, muscle protein catabolism provides the precursors for oxidation of branched chain amino acids and the synthesis and release of alanine for hepatic metabolism as a glyconeogenic substrate. Urinary nitrogen excretion is often elevated and the organism suffers negative nitrogen balance.

However, this adaptive procedure is often insufficiently effective in cases of severe stress or injury, such as surgery, infections, thermal injury, chronic infections, and the final stages of cancer and AIDS, where net loss of lean body mass may exceed 500 g/day (15-20 g urinary nitrogen excretion/day). This decreased ability of injured or infected organisms to utilize amino acids for protein synthesis is a contributing factor in the increased risk of morbidity and mortality that is observed in seriously ill patients. If the stress or injury is persistent, nitrogen losses will eventually deplete the body's protein pool and this catabolism will compromise critical functions resulting in a progressive deterioration of lean body mass and increased risk of severe complications that eventually may lead to death.

Stress or injury such as some forms of surgery and some traumata is often accompanied by partial or complete dysfunction of the gastro-intestinal tract. Patients suffering from such dysfunction or who are subject to disuse of the gastro-intestinal tract because of physician's prescription are obliged to receive most or all of their daily nutritional requirements parenterally and/or orally (including tube feeding). To avoid losses in lean body mass in patients who have suffered serious injury or trauma, it is common practice to supplement compositions used for enteral or parenteral feeding (infusion solutions) with amino acids to replace the amino acids secreted by the lean body mass. A typical nutritional infusion solution comprises an aqueous solution of carbohydrates, fats and amino acids. However, even when amino acids are parenterally administered with an infusion solution, a negative nitrogen balance is still often encountered over a sustained period of time, with a concomitant reduction in lean body mass, though the negative nitrogen balance might not be as severe as it would be in the absence of the infused amino acids. Thus, the period of time that parenteral feeding can be utilized as a sole means of nutrition is extended by the use of amino acids, but for many illnesses, the period is not extended sufficiently to avoid the serious effect of a prolonged net negative nitrogen balance.

A typical nutritional formula for enteral use will provide high amounts of protein and much energy per gram of product. However, such formulae are often ineffective in reversing net catabolism, even though they are sometimes capable of delaying net catabolism to some extent. The high density of nutrients causes several problems, including an adverse effect on taste and product stability. This is particularly important for patients suffering from metabolic stress who, due to their disease, suffer from reduced appetite and who generally are capable of consuming only relatively small amounts of food or drinks.

An anabolic response is desired during growth. Especially infants, in particular premature infants need effective nutritional support to achieve rapid weight gain and to increase life expectations.

Also sportsmen aim to increase their lean body mass in order to increase performance or because of cosmetic reasons. In order to achieve this, typically large amounts of protein, energy and other components are consumed, which may impart their natural dietetic benefits and therefore nutritional status. Typically, these products are dominant in protein, especially those from dairy origin.

SUMMARY OF THE INVENTION

The inventors have discovered that in mammals undergoing metabolic stress, e.g. as a result of injury, trauma or stress, methylation reactions fulfill a critical role in supporting the anabolic processes that are essential in counteracting the catabolic impact of said stress. Although the inventors do not wish to be bound by theory, it is believed that a mammal's capability to adequately start up, maintain and support these anabolic processes, and in particular its ability to maintain a positive nitrogen balance, is often compromised because its diet does not provide adequate quantities of methylation supporting agents.

Methylation reactions are very important biochemical processes that occur in the body of all mammals. Methylation reactions are characterized by the exchange of a moiety that comprises a single carbon atom (one-carbon metabolism), often a methyl radical, between two reactive molecules. For the purpose of this document reactions in which such moiety is transferred from a donor to an acceptor molecule is defined as a methylation reaction and the reverse reaction as a demethylation reaction. Well-known substances involved in methylation reactions include S-adenosyl methionine (SAM) and specific fo. In the body tetrahydrofolate (THF) may be methylated to various folate derivatives, including 5-methyl THF, 5-formyl THF, 10-formyl THF and 10-methylene THF, which are referred to in this document as methylated folates. In turn, these methylated folates may participate in methylation reactions as methyl donors by transferring their one carbon moiety (methyl, formyl or methylene radical) to a methyl acceptor. Thus, a methyl donor is a substance capable of participating in in vivo methylation reactions by transferring a one carbon moiety to another substance, the methyl acceptor.

Methylation reactions play a crucial role in various biosynthesis pathways and interlink many important metabolic processes. Examples of critical methylation reactions include the aforementioned methylation of folate, the conversion of glycine to serine and of homocysteine to methionine. Other examples of methylation reactions are the methylation of guanidino acetate to creatine, de novo biosynthesis of nucleotides (purines) and the biosynthesis of carnitine from proteinaceous lysine. An example of a demethylation reaction includes the conversion of betaine into dimethylglycine.

Transmethylation pathways closely interconnect choline, methionine, methyl THF and vitamins B6 and B12. The pathways intersect at the formation of methionine from homocysteine. Perturbing the metabolism of one of these pathways results in compensatory changes in the others. For example, methionine can be formed from homocysteine using methyl groups from methyl THF, or using methyl groups from betaine that are derived from choline. Similarly, methyl-THF can be formed from one-carbon units derived from serine or from methyl groups of betaine. Conversely, choline can be synthesized de novo using methyl groups derived from methionine (via S-adenosylmethionine).

The inventors believe that methylation and demethylation reactions are inter-related and that together they ensure that homeostasis of methyl-groups can be maintained. Without wanting to be bound by theory, the inventors believe that methyl-group homeostasis is a dominating factor in creating anabolism or catabolism.

A normal human diet provides nutritional components that are capable of providing available methyl groups (methyl donors) as well as components that are capable to act as methyl acceptor in vivo after digestion and first pass metabolism. Depending on the diet, the sum of methyl-donors may exceed the total amount of acceptors. Typically, this excess will be about 30-40 mmol, which meets average daily demands in normal situations.

The inventors have found that mammals undergoing metabolic stress have a strongly increased requirement for methyl donors in their diet. If the mammal's diet does not provide an adequate amount of excess methyl donors, anabolic processes will be suppressed or even come to a halt, resulting in a negative nitrogen balance and eventually in a condition of catabolism. The development of such a condition may be prevented by supplying an adequate amount of methyl donors together with sufficient nitrogen source, e.g. by ingesting or administering a nutritional or pharmaceutical preparation. However, the inventors have made the important discovery that the beneficial effect of methyl donors can be offset completely by methyl acceptors present in the same preparation. Thus, in order to prevent or treat catabolism in mammals undergoing metabolic stress, it is advantageous to administer a preparation that will provide a sufficiently high net amount of methyl donors. The net amount of methyl donors is defined in here as the difference between the molar amount of methyl donors and the molar amount of methyl acceptors that is administered.

DETAILED DESCRIPTION OF THE INVENTION

Accordingly, the present invention relates to a method of treating or preventing catabolism or of stimulating anabolism in a mammal undergoing metabolic stress, which method comprises administering to the mammal a composition containing methyl donors selected from the group consisting of L-serine, methionine, choline, phosphatidyl choline, betaine, dimethylglycine, sarcosine, methylated folates, S-adenosyl methionine, thymidine, nucleobase or nucleotides and combinations thereof and optionally methyl acceptors selected from the group consisting of L-glycine, phosphatidyl ethanolamine, folate, ribose and combinations thereof, wherein the total molar amount of methyl donors delivered by the method exceeds the total molar amount of methyl acceptors delivered by the method by at least 0.18 mmol per kg of body weight per day. Preferably, the total molar amount of methyl donors delivered by the present method exceeds the total molar amount of methyl acceptors by at least 0.22 mmol per kg of body weight per day, more preferably by at least 0.3 mmol per kg of body weight per day and most preferably by at least 0.8 mmol per kg of body weight per day such as more than 1.0, preferably more than 1.2, most preferably more than 1.5 mmol per kg of body weight per day.

It is noted that both the terms "methyl donors" and "methyl acceptors" not only encompass the representatives specifically mentioned herein, but also pharmaceutically acceptable salts thereof as well as precursors capable of liberating these substances in vivo when used in accordance with the present invention. Suitable examples of such precursors include proteins, peptides, glycoproteins, glycopeptides, oligosaccharides and polysaccharides. Polymeric precursors, such as proteins, may suitably contain a plurality of methyl donors and/or methyl acceptors. If the present composition contains, for example, 1 mmol of a protein containing 30 residues of a particular methyl donor, the composition is deemed to contain 30 mmol of said methyl donor.

The term "folates" includes folic acid and salts thereof. It is preferable to use reduced forms of folate such as tetrahydrofolates and folinic acid. The term "methylated folates" encompasses methyl folates, formyl folates and methylene folates.

In a preferred embodiment of the invention the methyl donors are selected from the group consisting of L-serine, methionine, choline, phosphatidyl choline, methylated folates, S-adenosyl methionine and combinations thereof. Even more preferably, the methyl donors are selected from the group consisting of L-serine, phosphatidyl choline, methylated folates and combinations thereof. In another preferred embodiment, the methyl donors are selected form serine, dimethylglycine and sarcosine. Most preferably, the methyl donor is L-serine. L-Serine is a particularly powerful methyl donor that can be administered in substantial quantities without significant side effects.

In a broad sense, L-glycine is the determining methyl acceptor. Preferably, phosphatidyl ethanolamine (PE) is also counted with the methyl acceptors. More preferably, The methyl acceptors are selected from glycine, PE, folate, ribose and nicotinamide. In another preferred embodiment, the methyl acceptors are selected from an even larger group further comprising homocysteine, ethanolamine, and uridine triphosphate.

The composition employed in the present method preferably contains at least 0.3 mmol of the methyl donors, up to about 0.8 mmol, per gram of dry matter. More preferably, the composition contains between 0.4 and 0.7 mmol methyl donors per gram of dry matter.

The present composition advantageously contains a significant amount of proteinaceous matter as proteinaceous matter is required to restore or maintain a positive nitrogen balance in the mammal. Whenever referred to in here, the term "proteinaceous matter" encompasses free amino acids, peptides and proteins. Typically, the present method employs a composition containing at least 20% proteinaceous matter, preferably at least 40% proteinaceous matter by weight of dry matter, and the method delivers at least 0.5 g proteinaceous matter, preferably at least 0.7 g, more preferably at least 1.0 g proteinaceous matter by kg of body weight per day. Preferably, the amount of methyl donors contained in the proteinaceous matter of the present composition is at least 0.9 mmol, more preferably at least 1.0 mmol and most preferably at least 1.2 mmol per gram of the proteinaceous matter.

In a particular embodiment the amounts of methyl donors and methyl acceptors referred to herein are defined with respect to proteinaceous methyl donors and acceptors. Of the naturally occurring amino acids, serine and methionine are methyl donors and glycine is a methyl acceptor. The other amino acids are considered to be neutral in this respect, although arginine and lysine can act as a methyl acceptor under certain conditions; for the purpose of the present definition however, they are also considered to be neutral.

Not all sources of L-serine are equally effective methyl donors. In particular phosphatidyl serine and conjugated non-proteinaceous serine derivatives are believed to be less useful than, for instance, the free amino acid L-serine. Consequently, the method preferably comprises administering a source of L-serine in an amount that does not deliver more than 0.01 mmol per kg of body weight per day of a serine-containing methyl donor selected from the group consisting of phosphatidyl serine, conjugated serine derivatives and combinations thereof.

In order to prevent that the rate of in vivo anabolic processes will decrease to an unacceptably low level, it is advisable to administer the present composition at least once daily. The composition is suitably administered orally, intravenously or through enteral feeding.

The molar amount of L-glycine, if present in the composition, preferably does not exceed 30% of the molar amount of the methyl donors contained therein.

In a particularly preferred embodiment of the invention, the composition contains a significant amount of serine and/or methionine. Preferably, the composition contains at least 0.1 mmol serine and/or methionine by weight of proteinaceous matter. The present composition advantageously contains a combination of L-serine and methionine, preferably in a molar ratio within the range of 10:1 and 1:10. More preferably, said ratio is within the range of 6:1 and 1:6, most preferably it does not exceed 1:4. The amount of cysteine contained in the present composition preferably is below 3% by weight of proteinaceous matter. Typically, the molar ratio of cysteine to methionine will be less than 4:1, preferably less than 3:1.

Metabolic stress is the condition in which the body metabolizes nutrients at a greater rate than the nutrients are supplied to the body, which can result in a state of destructive metabolism, also referred to as catabolism. This state can be induced by illnesses, particularly those illnesses that interfere with normal digestion, e.g. infections of the gastrointestinal tract. Often, this state is caused by surgery which is disruptive of normal metabolism processes. Further the state can be induced by traumas which induce a necessity for high caloric intake. For example, a burn patient may require as many as 7,000 calories per day due to damage to the body and the results thereof occasioned by the burn. Patients suffering from a catabolic state suffer from severe body weight loss which can result in pronounced complications to the primary malady, severe body damage and even death.

Although catabolism may be induced in the aforementioned individuals by a shortage of nutrient intake, insufficient net intake of methyl donors is believed to also be a very important factor. In order for mammals to be able to effectively metabolize nutrients needed for anabolic processes, a surplus of methyl donors is required. In mammals undergoing metabolic stress, e.g. as a result of injury, trauma or infections, the net requirement for methyl donors is exceptionally high because methyl donors are excreted and/or metabolized at an elevated rate and/or because anabolic processes are occurring at an extremely high rate. The average diet does not provide methyl donors in a net amount that is sufficient for preventing or treating catabolism in such individuals. Consequently, supplementation of methyl donors, optionally together with proteinaceous matter, is highly desirable in patients suffering from injury, trauma and/or infections.

Chronic infections, including Crohn's disease, inflammatory bowel disease and AIDS, are a particular target for the method of the invention.

In addition, this form of supplementation is beneficial in individuals who undergo metabolic stress as a result of extreme physical exercise, e.g. in athletes. Furthermore, this form of supplementation may be used advantageously to support anabolic processes in individuals who experience elevated rates of tissue growth, e.g. in infants or in pregnant and lactating females.

The present method may be employed to treat subjects suffering from some form of metabolic stress. Specific examples of subjects that may suitably be treated by means of the present method include patients undergoing radiation therapy or chemotherapy; trauma patients or patients who have undergone surgery; individuals suffering from a dysfunction of the gastrointestinal tract; pregnant or lactating females; infants, especially pre-term infants and athletes; elderly persons especially elderly persons of high age (e.g. over 75) or elderly suffering from sever body weight loss.

The method according to the present invention is particularly suitable for treating individuals who suffer from a pronounced form of metabolic stress as evidenced by a normalized urinary nitrogen excretion of at least about 15 g/day.

In a particularly preferred embodiment of the present invention, a significant fraction of the methyl donors is administered in the form of L-serine as L-serine is a particularly powerful methyl donor. Particularly suitable sources of L-serine include the free amino acid, serine containing peptides and protein and glycosylated derivatives thereof. Thus, the method preferably comprises administering at least 0.1 mmol L-serine per kg of body weight per day in the form of one or more sources of L-serine selected from the group consisting of: free L-serine; a L-serine containing oligopeptide comprising between 2 and 5 amino acid residues; glycosylated derivatives of said free L-serine; and glycosylated derivatives of said oligopeptide.

In an advantageous embodiment of the invention, the present method comprises the co-administration of vitamins that fulfill an important role as co-enzymes in biological methylation processes, especially folate, vitamin B6 and vitamin B12. Preferably, the method comprises co-administering at least 12 nmol of folate per kg of body weight per day, which is equivalent to an amount of about 400 µg per day for an adult. The co-administered amount of vitamin B6 per kg of body weight per day preferably is at least 0.21 µmol, i.e. at least about 2.5 mg per day per adult. Vitamin B12 is advantageously co-administered in an amount of at least 0.03 nmol per kg of body weight per day or at least about 2.8 µg per day for an adult. The terms "vitamin B6" and "vitamin B12" encompass precursors capable of delivering these vitamins in vivo when used in accordance with the present method as well as any metabolites of these vitamins that have a similar biological functionality.

Advantageously, the present composition has also been found beneficial for other applications, in particular for:
- increasing anabolic processes as is strongly desired in infants, especially those of low birth weight;
- providing an increase of the lean body mass,
- prevention and/or treatment of muscle catabolism or even cachexia as may occur after surgery, after traumata, during cardiovascular disease, with pancreas disorders, tumors, like those in liver, pancreas lung and kidney, during malnutrition, during several neurological disorders, during lung emphysema and other respiratory diseases, liver disorders like cirrhosis, severe inflammation like during inflammatory bowel disease, pancreatitis, hepatitis, AIDS and during severe insulin resistance as may occur in diabetes;
- improving the energy status of tissues and cells, which will improve results during intermittent exercise, and is important during ischaemia/reperfusion situations.

Advantageously, the increase of lean body mass and energy status leads to an increase in muscle strength and power. In addition vegetarians will profit from the invention composition since the presence of creatine is for a majority of vegetarians marginal.

Accordingly, in another aspect of the invention, there is provided a method for the stimulation and/or increase of anabolic processes and/or the providing of an increase of the lean body mass, and/or prevention and/or treatment of muscle catabolism or even cachexia and/or for the improvement of the energy status of tissues and cells by administering to the mammal a composition containing methyl donors selected from the group consisting of L-serine, methionine, choline, phosphatidyl choline, betaine, dimethylglycine, sarcosine, methylated folates, S-adenosyl methionine, thymidine triphosphate, adenosine triphosphate and optionally methyl acceptors selected from the group consisting of L-glycine, ethanolamine, phosphatidyl ethanolamine, folate, ribose, wherein the total molar amount of methyl donors delivered by the method exceeds the total molar amount of methyl acceptors delivered by the method by at least 0.18 mmol per kg of body weight per day.

In addition, especially when the methyl donors are in large excess of the methyl acceptor, like the GA or equivalents thereof, the present composition has also been found beneficial for the prevention and/or treatment, in particular prevention of disorders selected from:
- cancer, especially cancer to liver, kidneys, pancreas, testis, mammae, ovaria and prostate and colon, but also by prevention of the occurrence of hyperproliferation in tissue like gut (polyps), skin (warts) or prostate,
- neurological disorders such as Alzheimer's disease or other dementias, Parkinson's disease, sensitivity to pain, depression, multiple sclerosis and epilepsy,
- migraine, allergy, insulin resistance which improves glucose tolerance and decreases side effects of diabetes type II,
- cardiovascular and cerebrovascular disorders such as those described in WO 01/84961, hypertension, prevention of hearing loss,
- sub fertility,
- uncontrolled inflammation processes such as during inflammatory bowel diseases (e.g. Crohn's disease), pneumonia, but also by providing improvement of wound healing and especially decubitus, improvement of gut barrier function and prevention of sepsis.

By "excess methylation power", it is meant that the molar amount of methyl donors exceeds the molar amount of methyl acceptors, and preferably the amount of methyl donors minus methyl acceptors exceeds the average requirement for methyl groups per day as per given hereinbefore.

Accordingly, in another aspect of the invention, there is provided a method for the prevention and/or treatment, in particular prevention of disorders selected from cancer, neurological disorders, migraine, allergy, insulin resistance which improves glucose tolerance and decreases side effects of diabetes type II, cardiovascular and cerebrovascular disorders, hypertension, subfertility, uncontrolled inflammation processes, pneumonia, and/or prevention of hearing loss, and/or improvement of wound healing, and/or improvement of gut barrier function and/or prevention of sepsis, by administering to the mammal a composition containing methyl donors selected from the group consisting of L-serine, methionine, choline, phosphatidyl choline, betaine, dimethylglycine, sarcosine, methylated folates, S-adenosyl methionine, thymidine triphosphate, adenosine triphosphate and optionally methyl acceptors selected from the group consisting of L-glycine, ethanolamine, phosphatidyl ethanolamine, folate, ribose, and preferably also nicotinamide, wherein the total molar amount of methyl donors delivered by the method exceeds the total molar amount of methyl acceptors delivered by the method by at least 0.18 mmol per kg of body weight per day, preferably of at least 0.8 mmol per kg of body weight per day.

Additionally, the administration of a particular methyl donor, namely L-serine, has been found beneficial to the methylation capacity of organisms. Accordingly, in another aspect of the present invention, there is provided a method for increasing the methylation capacity of a subject, which method comprises administering to the mammal a composition containing methyl donor L-serine, and optionally methyl acceptors selected from the group consisting of L-glycine, ethanolamine, phosphatidyl ethanolamine, folate, ribose, wherein the total molar amount of methyl donors delivered by the method exceeds the total molar amount of methyl acceptors delivered by the method by at least 0.18 mmol per kg of body weight per day.

Furthermore the administration of one or more of the methyl donors referred to above, in particular serine, dimethylglycine and/or sarcosine, was found to be beneficial for stimulating the immune function, preventing allergy and combating of chronic fatigue.

Another aspect of the invention relates to a pharmaceutical or nutritional composition containing:
  a. at least 0.5 mmol of one or more methyl donors per gram of dry matter, said methyl donors being selected from the group consisting of L-serine, methionine, choline, phosphatidyl choline, betaine, dimethylglycine, sarcosine, methylated folates, S-adenosyl methionine, thymidine triphosphate, and adenosine triphosphate; and
  b. between 0.01 μmol and 1 mmol, especially between 0.01 and 0.2 mmol, of one or more methyl acceptors per gram of dry matter, said methyl acceptors being selected from the group consisting of L-glycine and phosphatidyl ethanolamine, preferably selected from a larger group also including folate, ribose and nicotinamide;
wherein the methyl donors and methyl acceptors are contained in the composition in a molar ratio of at least 3:1, preferably at least 3.4:1, more preferably at least 3.6:1 or even at least 4.2:1. Preferably, the composition contains at least 1 mmol, more preferably at least 1.4 mmol, most preferably at least 2 mmol of methyl donors per gram of dry matter. These values can apply to all donors, or more preferably to one of the preferred groups of donors, or most preferably to L-serine.

A pharmaceutical or nutritional composition as defined above is particularly suitable for use in a method of treatment as described herein before as it contains a relatively concentrated net amount of methyl donors. In a particularly preferred embodiment methyl donors are present in the composition in a much higher amount than methyl acceptors. Accordingly, the present composition preferably contains methyl donors and methyl acceptors in a ratio of at least 5:1, more preferably of at least 7:1 and most preferably of at least 8:1 or even about 10. In particularly, these ratios can also apply to L-serine being considered as the only methyl donor and L-glycine being considered as the only methyl acceptor.

As explained herein before, it is advantageous to combine the administration of methyl donors and nitrogen sources with the supply of vitamins, notably folate, vitamin B6 and vitamin B12. Thus, in a preferred embodiment, the present composition additionally contains at least 0.8 μmol of folate. In another preferred embodiment, the composition additionally contains at least 15 μmol of vitamin B6. In yet another preferred embodiment the composition additionally contains at least 2.2 nmol of vitamin B12.

The present pharmaceutical or nutritional compositions is suited for enteral administration and preferably for oral administration. As regards oral administration, the composition may be provided in solid, semi-solid or liquid. The present composition may suitably take the form of a (reconstitutable) beverage, a bar, an ice cream, a meal component (e.g. a soup or a dessert) an aqueous fluid for enteral feeding.

In a particularly preferred embodiment, the present composition is pourable and contains at least 80 wt. % water. Even more preferably, the present composition does not contain solid particles with a size of 1 mm or more. In addition to proteinaceous matter and methyl donors/acceptors, the present composition preferably contains additional nutrients, especially carbohydrates and lipids. Typically, the amounts of proteinaceous matter, carbohydrates and lipids contained in the present composition, expressed as energy percentages are within the following ranges: protein 15-100%, carbohydrates 0-60%, lipids (including phospholipids) 0-50%. In a particularly preferred embodiment of the invention the present composition is a complete formulation useful for enteral administration containing 15-35 en % of protein, 35-55 en % of carbohydrates and 30-50 en % of lipids. Also nutritional supplements are part of the invention, which can contain 35-100% of protein, 5-35 en % of carbohydrates and 3-65 en % of lipids. Liquids for intravenous administration must be sterile and preferably do not contain any undissolved components and allergens like proteins.

Preferably, the composition also comprises the necessary vitamins, minerals and dietary fibers, e.g. 1-50 mg of dietary fiber per g dry matter.

Another aspect of the invention relates to a pharmaceutical or nutritional composition containing:
  at least 40% proteinaceous matter by weight of dry matter;
  at least 0.3 mmol per gram of dry matter of L-serine; and
  L-glycine in a molar amount that does not exceed 30% of the molar amount of L-serine contained in the composition.

Preferably the composition contains at least 0.4 mmol L-serine per gram of dry matter and more preferably between 0.4 and 0.7 mmol L-serine per gram of dry matter as hereinbefore given. In a preferred embodiment, the proteinaceous matter is comprised of at least 50 wt. % of whey protein.

A pharmaceutical or nutritional composition as defined above is particularly suitable for use in a method of treatment as described herein before as it contains a relatively concentrated net amount of methyl donors. In a particularly preferred embodiment methyl donors are present in the composition in a much higher amount than methyl donors. Accordingly, the present composition preferably contains methyl donors and methyl acceptors in a ratio of at least 3:1, wherein the methyl donors and methyl acceptors are selected as given above.

For the purpose of the present invention, compositions where the methyl donor is L-serine and the methyl acceptor is guanidino acetate are not encompassed by the present composition.

The inventors also found that in devising a complete food, attention should not only be given to the required profile of energy components and microcomponents, but also the methylation balance of the food as a whole. Hence, the invention also pertains to a method of producing a complete nutritional composition comprising sufficient amounts of protein, carbohydrates and lipids and optionally fibers, vitamins and minerals, wherein the method comprises the steps of:

a. determining the total amount of methyl donors in said nutritional components, b. determining the total amount of methyl acceptors in said nutritional components;

c. if the weight ratio of said total amount of methyl donors to said total amount of methyl acceptors is below 3, adding an amount of one or more of said methyl donors such that said ratio, after the addition, is at least 3.

Preferably, the minimum weight ratio between methyl donors and methyl acceptors in this method is 3.4, more preferably 3.6 or even 4.2.

The forms and administration of the above composition are those described hereinbefore.

EXAMPLES

Example 1

Complete Tube Feeding for Enteral Administration

Protein: 17 en %, digestible carbohydrates: 47 en %, lipids: 36 en %.
The composition contains, per 100 ml, 4.0 g casein, 0.2 g L-serine, 12.2 g maltodextrins, 3.9 g vegetable oils, 0.2 g lecithin, 0.1 g dimethylglycine, minerals and vitamins according to recommendations except folic acid (30 μg), vitamin B6 (0.2 mg), vitamin B12 (0.5 μg).

Example 2

Protein-rich Product for Athletes

Powder to be dissolved in a drink. The product contains, per 100 g powder, 94 g whey protein concentrate, 1 g creatine, 1 g L-serine, 1 g L-leucine, 2 g flavors, 0.5 g xanthan gum, 0.3 g colorant, 0.1 g sucralose, 0.1 g citric acid.

Example 3

Infant Formula for Preterm Babies

Protein: 12 en %, digestible carbohydrates: 39 en %, lipids: 49 en %.
Powder which contains, per 100 ml after dissolving in with water according to prescription: Protein: whey 1.4 g, casein 0.9 g, L-serine 0.1 g;
Carbohydrates: lactose 6.0 g, maltodextrins 1.8 g;
Lipids: butter fat 1.3 g, mixture of marine oils 0.05 g, vegetable oils 2.4 g, lecithin 0.25 g.
Minerals and vitamins according to recommendations except vitamin B12 (as hydroxyl-cobalamine: 0.3 μg).

Example 4

Product for Persons Suffering from Pressure Wounds

Pudding comprising, per 100 g:
Protein: 31 en % (dairy 9.9 g, L-Arg 0.1 g, L-Ser 0.2 g)
Carbohydrates: 49 en % (sucrose 9.4 g, lactose 4.2 g, saccharides from maltodextrins 2.3 g)
Lipids: 20 en % (butter fat 1.0 g, algal oil 0.2 g, vegetable oils 1.8 g).

Minerals and vitamins according to recommendations except vitamin C (30 mg) and folic acid and vitamins B12 and B6 (as in example 1).

Example 5

Product for Athletes

| | |
|---|---:|
| wpc 80* (yielding 40 grams of whey protein) | 50 grams |
| whey protein hydrolysates | 2 grams |
| calcium caseinate | 8 grams |
| L-leucine | 2.8 grams |
| L-isoleucine | 0.1 grams |
| L-valine | 0.1 grams |
| L-glutamine | 1.0 grams |
| L-serine | 0.8 grams |

*wpc 80: whey protein concentrate having an average protein content of about 80% on weight basis.

Example 6

Product for Athletes to be Dissolved in a Liquid Before Consumption

| | |
|---|---:|
| calcium caseinate | 40 grams |
| wpc 80 (yielding 8 grams of whey protein) | 10 grams |
| whey protein hydrolysates | 2 grams |
| L-leucine | 2.8 grams |
| L-isoleucine | 0.1 grams |
| L-valine | 0.1 grams |
| L-glutamine | 1.0 grams |
| L-serine | 0.8 grams |

Example 7

Product for Anabolic Purposes

| | |
|---|---:|
| wpc 80 (yielding 40 grams of whey protein) | 50 grams |
| whey protein hydrolysates | 2 grams |
| calcium caseinate | 8 grams |
| L-leucine | 2.8 grams |
| L-isoleucine | 0.1 grams |
| L-valine | 0.1 grams |
| L-glutamine | 1.0 grams |
| L-serine | 0.8 grams |
| pectin | 3 grams |
| calcium (as calcium carbonate) | 0.2 grams |

Example 8

Product for Improving Lean Body Mass

| | |
|---|---:|
| wpc 80 (yielding 30 grams of whey protein) | 37.5 grams |
| calcium caseinate | 5 grams |
| egg white protein | 5 grams |
| L-glutamine | 5 grams |
| L-leucine | 1.5 grams |
| L-isoleucine | 0.75 grams |

-continued

| | |
|---|---|
| L-valine | 0.75 grams |
| L-serine | 0.8 grams | wpc 80: whey protein concentrate having an average protein content of about 80% on weight basis.

Example 9

Liquid formula for complete nutrition of a person that is at risk or suffering from decubitus that comprises per 100 ml:

| Component | levels |
|---|---|
| Caseinate (mix of sodium and calcium caseinates) | 4 g |
| L-serine | 0.3 g |
| L-histidine | 0.1 g |
| digestible carbohydrates (maltodextrin DH19) | 12.3 g |
| Lipids (mixture of vegetable oils) | 3.9 g |
| Vitamin premix 3 | 2.0 g |

Example 10

Liquid formula for perioperative use, comprising per 100 ml:

| Component | levels |
|---|---|
| L-serine | 4 g |
| digestible carbohydrates | 4 g |
| folic acid | 200 µg |
| vitamin B12 | 4 µg |
| vitamin B6 | 2 mg |
| pantothenic acid | 10 mg |
| Biotin | 1 mg |
| egg phospholipids | 2 g |
| olive oil, sunflower oil (50/50) | 2 g |
| flavor premix | 0.2 g |

Example 11

Infant formula for premature infants that comprises per 100 ml

| Component | levels |
|---|---|
| Casein | 0.4 g |
| Whey | 0.6 g |
| L-serine | 0.2 g |
| Lactose | 7.1 g |
| Lipids | 3.6 g |
| Na | 18 mg |
| K | 65 mg |
| Cl | 40 mg |
| Ca | 42 mg |
| P | 21 mg |
| Mg | 5 mg |
| Zn | 0.5 mg |
| Fe | 0.6 mg |
| Cu | 0.05 mg |
| I | 10 µg |
| Vitamin A | 80 µg RE |
| Vitamin D3 | 1.4 µg |
| Vitamin E | 0.8 mg TE |
| Vitamin K | 15 µg |
| Vitamin B1 | 40 µg |
| Vitamin B2 | 0.1 mg |

-continued

| Component | levels |
|---|---|
| Vitamin B3 | 0.75 mg |
| folic acid | 20 µg |
| pantothenic acid | 0.3 mg |
| Vitamin B6 | 60 µg |
| Vitamin B12 | 0.6 µg |
| Biotin | 1.5 µg |
| Vitamin C | 7 mg |
| Choline | 7 mg |
| Taurine | 4.6 mg |

Example 12

| Pudding for pregnant women comprising per 100 g: | |
|---|---|
| skimmed milk powder | 8 g |
| L-serine | 0.2 g |
| saccharose | 8 g |
| lactose | 3.6 g |
| carrageenan | 0.2 g |
| modified starch | 1.1 g |
| maltodextrins | 2.3 g |
| egg lecithin | 1.0 g |
| algal/fish oil (providing EPA and DHA) | 0.2 g |
| tocopherols | 10 mg |
| folic acid | 200 ug |
| vitamin B12 | 2 ug |
| vitamin B6 | 1 mg |
| vitamin C | 10 mg |
| citric acid | 0.3 g |
| dimethylglycine | 0.6 g |
| flavor premix | 0.1 g |
| fruit concentrate | 1.0 g |

I claim:

1. A method for maintaining a positive nitrogen balance in a mammal undergoing metabolic stress, which method comprises administering to the mammal a composition containing methyl donors selected from the group consisting of L-serine, methionine, choline, phosphatidyl choline, betaine, dimethylglycine, sarcosine, methylated folates, S-adenosyl methionine, thymidine triphosphate, adenosine triphosphate and methyl acceptors selected from the group consisting of L-glycine, enthanolamine, Phosphatidyl ethanolamine, folate, and ribose, wherein the total molar amount of methyl donors delivered by the method exceeds the total molar amount of methyl acceptors delivered by the method by at least 0.18 mmol per kg of body weight per day so that a positive nitrogen balance is maintained in the mammal undergoing metabolic stress.

2. The method according to claim 1 for providing an increase of the lean body mass, and/or preventing and/or treating muscle catabolism or cachexia in a mammal undergoing metabolic stress.

3. The method according to claim 1, wherein the mammal undergoing metabolic stress suffers from a condition selected from the group consisting of cancer, neurological disorders, migraine, allergy, insulin resistance, cardiovascular and cerebrovascular disorders, hypertension, subfertility, uncontrolled inflammation processes, pneumonia, hearing loss, wound healing, and sepsis.

4. The method according to claim 1, wherein the methyl donors are selected from the group consisting of L-serine, choline, phosphatidyl choline, dimethylglycine and sarcosine.

5. The method according to claim 1, wherein the methyl donor is L-serine.

6. A method for increasing the methylation capacity in a mammal, which method comprises administering to the mammal a composition containing the methyl donor L-serine, and methyl acceptors selected from the group consisting of L-glycine and phosphatidyl ethanolamine, wherein the total molar amount of methyl donor delivered by the method exceeds the total molar amount of methyl acceptors delivered by the method by at least 0.18 mmol per kg of body weight per day so that a positive nitrogen balance is maintained in the mammal undergoing metabolic stress.

7. The method according to claim 6, wherein the methyl acceptors are selected from the group consisting of L-glycine, homocysteine, ethanolamine, phosphatidyl ethanolamine, folate, uridine triphosphate, ribose, and nicotinamide.

8. The method according to claim 6, wherein the composition contains at least 0.3 mmol of the methyl donors per gram of dry matter.

9. The method according to claim 6, wherein the composition contains at least 20% proteinaceous matter by weight of dry matter and the method delivers at least 0.5 g proteinaceous matter per kg of body weight per day.

10. The method according to claim 6, wherein the composition is administered orally, intravenously or through enteral feeding.

11. The method according to claim 6, wherein the subject is a patient undergoing radiation therapy or chemotherapy.

12. The method according to claim 6, wherein the subject is a trauma patient or a patient who has undergone surgery.

13. The method according to claim 6, wherein the subject is an individual suffering from a dysfunction of the gastrointestinal tract.

14. The method according to 6, wherein the subject is a pregnant or lactating female or an infant.

15. The method according to claim 6, wherein the subject is an athlete.

16. The method according to claim 6, wherein the subject is exhibiting a normalized urinary nitrogen excretion of at least about 15 g/day.

17. A method of stimulating immune function, preventing allergy or combating chronic fatigue in a mammal, comprising administering to the mammal a composition containing one or more methyl donors selected from L-serine, dimethylglycine and sarcosine, wherein the weight ratio of said methyl donors to the methyl acceptors selected from the group consisting of L-glycine and phosphatidyl ethanolamine, if present, is at least 3.4.

18. A method for preventing a negative nitrogen balance in a mammal undergoing metabolic stress, which method comprises administering to the mammal a composition containing methyl donors selected from the group consisting of L-serine, methionine, choline, phosphatidyl choline, betaine, dimethylglycine, sarcosine, methylated folates, S-adenosyl methionine, thymidine triphosphate, adenosine triphosphate and methyl acceptors selected from the group consisting of L-glycine, enthanolamine, phosphatidyl ethanolamine, folate, and ribose, wherein the total molar amount of methyl donors delivered by the method exceeds the total molar amount of methyl acceptors delivered by the method by at least 0.18 mmol per kg of body weight per day so that a positive nitrogen balance is maintained in the mammal undergoing metabolic stress.

19. The method according to claim 18 for providing an increase of the lean body mass, and/or preventing and/or treating muscle catabolism or cachexia in a mammal undergoing metabolic stress.

20. The method according to claim 18, wherein the mammal undergoing metabolic stress suffers from a condition selected from the group consisting of cancer, neurological disorders, migraine, allergy, insulin resistance, cardiovascular and cerebrovascular disorders, hypertension, subfertility, uncontrolled inflammation processes, pneumonia, hearing loss, wound healing, and sepsis.

21. A method for maintaining a positive nitrogen balance in a mammal undergoing metabolic stress, which method comprises administering to the mammal a composition containing methyl donors selected from the group consisting of L-serine, methionine, choline, phosphatidyl choline, betaine, dimethylglycine, sarcosine, methylated folates, S-adenosyl methionine, thymidine triphosphate, adenosine triphosphate and methyl acceptors selected from the group consisting of L-glycine, enthanolamine, Phosphatidyl ethanolamine, folate, ribose, wherein the total molar amount of methyl donors delivered by the method exceeds the total molar amount of methyl acceptors delivered by the method by at least 0.18 mmol per kg of body weight per day so that a positive nitrogen balance is maintained in the mammal undergoing metabolic stress.

22. A method for preventing a negative nitrogen balance in a mammal undergoing metabolic stress, which method comprises administering to the mammal a composition containing methyl donors selected from the group consisting of L-serine, methionine, choline, phosphatidyl choline, betaine, dimethylglycine, sarcosine, methylated folates, S-adenosyl methionine, thymidine triphosphate, adenosine triphosphate and methyl acceptors selected from the group consisting of L-glycine, enthanolamine, phosphatidyl ethanolamine, folate, ribose, wherein the total molar amount of methyl donors delivered by the method exceeds the total molar amount of methyl acceptors delivered by the method by at least 0.18 mmol per kg of body weight per day so that a positive nitrogen balance is maintained in the mammal undergoing metabolic stress.

* * * * *